United States Patent [19]

Tanaka et al.

[11] Patent Number: 4,701,881
[45] Date of Patent: Oct. 20, 1987

[54] MAGNETO-OPTICAL RECORDING MEDIUM

[75] Inventors: Fujio Tanaka, Tanashi; Nobutake Imamura, Kamakura, both of Japan

[73] Assignee: Kokusai Denshin Denwa Kabushiki Kaisha, Tokyo, Japan

[21] Appl. No.: 748,580

[22] Filed: Jun. 25, 1985

[30] Foreign Application Priority Data

Jul. 9, 1984 [JP] Japan ................................. 59-140672

[51] Int. Cl.$^4$ ............................................. G11C 11/42
[52] U.S. Cl. ..................................... 365/122; 360/135
[58] Field of Search .......................... 365/10, 32, 122; 360/59, 131, 135; 369/13

[56] References Cited

U.S. PATENT DOCUMENTS

| | | | |
|---|---|---|---|
| 4,126,494 | 11/1978 | Imamura et al. | 365/122 |
| 4,559,573 | 12/1985 | Tanaka et al. | 365/122 |
| 4,586,092 | 4/1986 | Martens et al. | 365/122 |
| 4,645,722 | 2/1987 | Katayama | 365/122 |

*Primary Examiner*—James W. Moffitt
*Attorney, Agent, or Firm*—Robert E. Burns; Emmanuel J. Lobato

[57] ABSTRACT

A magneto-optical recording medium is disclosed in which a magnetic thin film recording layer is formed by a magnetic material having a Curie temperature or magnetic compensation temperature as low as 50° to 250° C. and a coercive force as large as 1 KOe or more and having an easy axis of magnetization perpendicularly to the film surface. A substantially transparent magnetic material film layer of ferrite, garnet or the like is disposed adjacent the recording film layer, large in the Faraday rotation angle and having an easy axis of magnetization perpendicularly to the film surface. A transparent substrate is disposed on the side of incidence of light. The substantially transparent magnetic material layer of the ferrite, garnet or the like may increase the magneto-optical rotation angle in the magnetic thin film recording layer, or may increase the magneto-optical rotation angle by the Faraday effect. The thickness of the substantially transparent magnetic material layer is selected in such a region where the figure of merit $\sqrt{R}\cdot\theta_k$ expressed by its reflectivity $R$ and the magneto-optical rotation angle $\theta_k$ is maximum.

5 Claims, 4 Drawing Figures

INPUT LIGHT λ

OUTPUT LIGHT R, θ_K

MAGNETO-OPTICAL RECORDING MEDIUM

BACKGROUND OF THE INVENTION

The present invention relates to a magneto-optical recording medium for use as a magneto-optical memory, a magnetic recording and display cell and so forth, and more particularly to a magnetic thin film recording medium which has an easy axis of magnetization in a direction perpendicular to the film surface and permits recording of a bit of information by forming an inverted magnetic domain of a circular or any other arbitrary configuration and reading out of the information through utilization of the magnetic Kerr effect.

With ferromagnetic thin films which have an easy axis of magnetization in a direction perpendicular to their film surface, it is possible to create a small inverted magnetic domain of a magnetic polarity reverse from a homogenous magnetization polarity in the film surface homogeneously magnetized with the south or north magnetic pole. By making the presence and absence of such an inverted magnetic domain correspond to a "1" and a "0" in digital form, respectively such ferromagnetic thin films can be employed as high density magnetic recording media. These ferromagnetic, vertically magnetized films are typified by, for example, Gd-Co, Gd-Fe, Tb-Fe, Dy-Fe, GdTbFe, etc. as amorphous rare earth transition metal alloy thin films, MnBi as a polycrystalline metal thin film and GIG as a compound single crystal thin film.

However, since their Curie temperature or magnetic compensation temperatures are high, a large recording power is needed and, at present, high speed recording by the use of a semiconductor laser is impossible.

SUMMARY OF THE INVENTION

An onject of the present invention is to provide a magneto-optical recording medium of a higher signal to noise ratio improved over the structure of conventional art.

In accordance with the present invention, there is provided a magneto-optical recording medium comprising; a magnetic thin film recording layer of a magnetic material having a Curie temperature or magnetic compensation temperature as low as 50° to 250° C. and a coercive force as large as 1 KOe or more and having an easy axis of magnetization perpendicularly to the film surface; a substantially transparent magnetic material film layer of ferrite, garnet or the like disposed adjacent the recording film layer, large in the Faraday rotation angle and having an easy axis of magnetization perpendicularly to the film surface; and a transparent substrate disposed on the side of incidence of light.

The substantially transparent magnetic material layer of the ferrite, garnet or the like may increase the magnetooptical rotation angle in the magnetic thin film recording layer.

The substantially transparent material layer of ferrite, garnet or the like may increase the magneto-optical rotation angle by the Faraday effect.

The thickness of the substantially transparent magnetic material layer is selected in such a region where the figure of merit $\sqrt{R} \cdot \theta_k$ expressed by its reflectivity R and the magneto-optical rotation angle $\theta_k$ is maximum.

BRIEF DESCRIPTION OF THE DRAWINGS

The present invention will be described in detail below in comparison with conventional art with reference to the accompanying drawings, in which.

DETAILED DESCRIPTION

To make differences between conventional art and the present invention clear, examples of conventional art will first be described.

Figure 1:
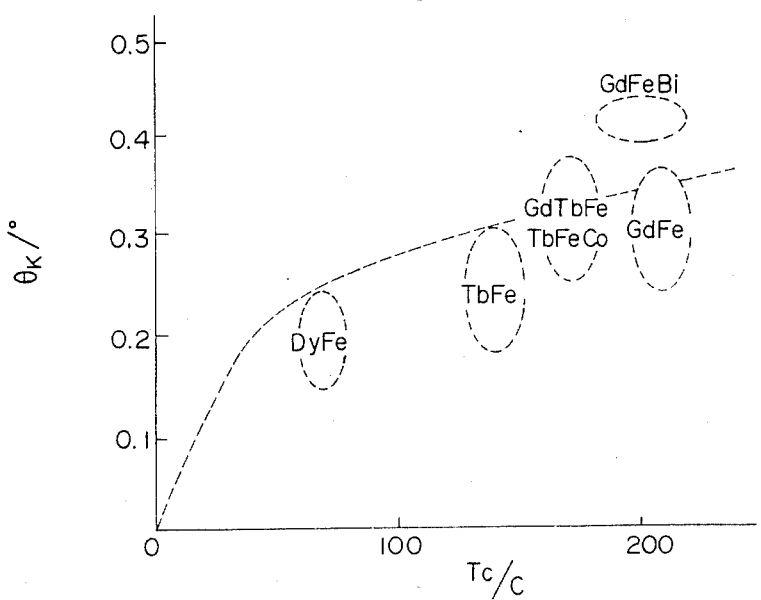
FIG. 1 is a graph showing the relationship between the Curie temperature Tc and the Kerr rotation angle $\theta_k$.

The recording operation of information in a ferromagnetic, perpendicularly magnetized film is usually effected by heating them up to a temperature higher than the Curie temperature or magnetic compensation temperature of the thin films to form therein an inverted magnetic domain at an arbitrary position. The recorded information is reproduced through utilization of the Kerr effect where linearly polarized light is incident to and reflected by the magnetic thin film, the plane of polarization rotates to the right or left direction according to the direction of magnetization (the Kerr rotation). Incidentally, a signal to noise ratio (S/N) in the case of reading out the recorded signal by means of light is as follows:

$$S/N \, \alpha \sqrt{R} \cdot \theta_k$$

where R is the reflectivity of the magnetic thin film and $\theta_k$ (the Kerr rotation angle) is the rotation angle of the plane of polarization by the Kerr effect. This equation indicates that the signal to noise ratio could be raised by increasing the reflectivity r or the Kerr rotation angle $\theta_k$, but the reflectivity of the magnetic medium is approximately 50% and is constant regardless of the aforementioned kinds of media. The Kerr rotation angle $\theta_k$ varies with the kinds of media, as shown in FIG. 1, and it generally tends to increase with an increase in the Curie temperature Tc. Therefore, the signal to noise ratio could be improved by the use of GdFeBi or GdCoFe which has a large Kerr rotation angle $\theta_k$, but since its Curie temperature Tc or magnetic compensation temperature is high, a large recording power is needed and, at present, high speed recording by the use of a semiconductor laser is impossible.

Figure 2:
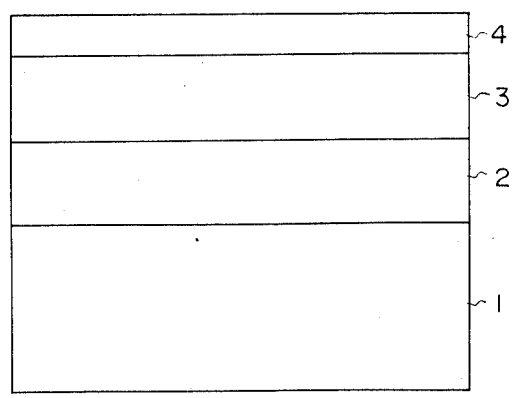
FIG. 2 is a longitudinal-section illustration an example of the structure of a conventional magneto-optical recording medium in which a recording layer and a reproducing layer are abutting each other.

Incidentally, as top data on C/N [where C/N=S/N+10 log (a noise band)/(resolution band width)] obtainable with a single-layer medium, there has been reported a value of 42 dB obtained with a medium of TdFe at a recording frequency of 1 MHz and in a band of 30 KHz. Then, as a method of improvement for obtaining higher C/N, there has been proposed such a struoture as shown in FIG. 2 in which the recording layer and the reproducing layer are abutting each other. This employs, as a reproducing layer 2, a high Curie temperature, low coercive force layer formed on a transparent substrate 1 as of glass or plastics and, as a recording layer 3, a low Curie temperature, high coercive force layer. A protective film layer 4 is also formed on the recording layer 3. Usually, GdFe or GdCo is used for the former and TbFe or DyFe for the latter. This utilizes a fact that a bit of information formed in the recording layer is also formed in the reproducing layer by a coupling phenomenon between the recording layer and the reproducing layer by virtue of megnetostatic force and exchange force therebetween. Therefore, the recording operation can be achieved even by a low recording power, and since the Kerr rotation angle $\theta_k$ of the reproducing layer is large, the reproducing operation can be carried out with a high C/N. In practice, C/N@45 dB has been obtained in the recording operation at a recording frequency of 1 MHz and with a recording laser power of 8 mW, and this value is higher than the C/N value of 42 dB obtainable with the aforesaid single-layer TbFe film.

The present invention will hereinafter be described in detail.

Figure 3:
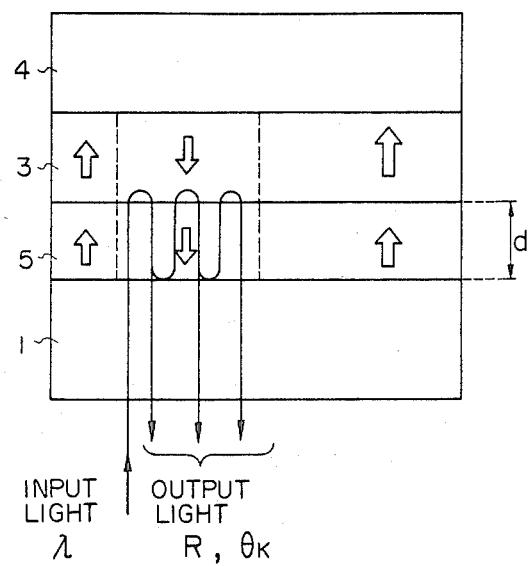
FIG. 3 is a longitudinal-section illustration an embodiment of the present invention.
Figure 4:
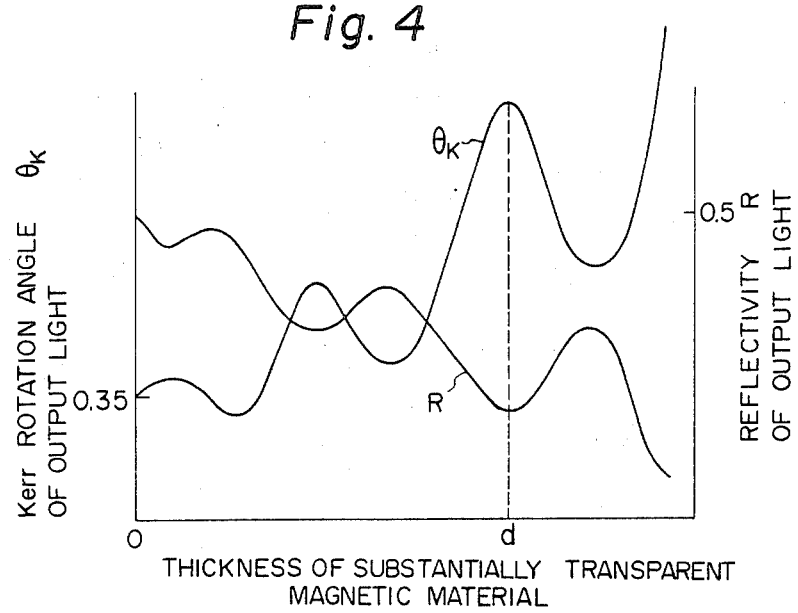
FIG. 4 is a graph showing characteristic curves of the embodiment depicted in FIG. 3.

FIG. 3 illustrates an embodiment of the present invention. The recording medium of this embodiment comprises a transparent substrate 1 of glass, acrylic resin or the like, a substantially transparent, vertically magnetized material film layer 5 of ferrite, garnet or the like which has a large Farady rotation angle and an easy axis of magnetization perpendicularly to the film surface, a vertically magnetized film 3 which is formed of a rare earth transition metal alloy such as TbFe, TbFeCo, GdTbFe or the like and which has a Curie temperature or magnetic compensation temperature as low as 50° to 250° C. and a coercive force as large as 1 KOe or more, and a protective film layer 4 of Si, SiO$_2$ or the like which serves to prevent oxidation of the vertically magnetized film 3. Recording and reproducing operations are effected by applying laser beam through the substrate. In the case of recording operation, it is necessary that the transparent magnetic material film layer 5 and the vertically magnetized rare earth transition metal film layer 3 be magnetized in the same direction by exchange coupling or magnetostatic coupling therebetween. By applying a reproducing laser beam ($\lambda$ nm in wavelength, linearly polarized) to the magnetization inverted domain, the plane of polarization is rotated by the Faraday effect when the light beam passes through the magnetic material film layer 5. Then, when the light beam subjected to the Faraday effect is reflected by the surface of the rare earth transition metal thin film layer 3, the plane of polarization is further rotated by the magnetic Kerr effect. The light beam reflected by the metal thin film 3 back to the magnetic material layer 5 is again subjected to the Faraday effect therein, by which the plane of polarization is further rotated to increase the rotation angle. The magneto-optical rotation angle $\theta_k$ of the emitted light thus repeatedly subjected to the above effect in the transparent material layer 5 is observed to have a very large value. In this case, however, the rotation angle $\theta_k$ increases while undergoing periodic variations as shown in FIG. 4. This phenomenon was effected by values of the refractive index and the thickness d of the substantially transparent magnetic material film layer 5 and the wavelength of laser light used. However, the reflectivity R and the magneto-optical rotation angle $\theta_k$ tend to vary as shown in FIG. 4. Therefore, by adopting such a film thickness d that maximizes the figure of merit $\sqrt{R}\cdot\theta_k$ in the reproducing operation, the signal to noise ratio of the reproducing characteristic will be greatly improved. Further, by using light of the same wavelength as the reproducing laser beam, it is possible to effect the recording operation with a low power since sensitivity is high only at the part of lowered reflectivity.

As described above, the structure of the present invention provides a magneto-optical recording medium of high recording sensitivity and a high reproducing signal to noise ratio.

The medium can be manufactured by a spray method, a dip method, a vacuum evaporation method, a sputtering method, a plasma CVD method and so forth.

As the substantially transparent magnetic material are available, for example, Fe$_3$O$_4$, CoFe$_2$O$_4$ and materials of the garnet systems.

What we claim is:

1. A magneto-optical recording medium comprising: a magnetic thin film recording layer of a vertically magnetized magnetic material formed of a rare earth transition metal alloy having a Curie temperature or magnetic compensation temperature as low as 50° to 250° and a coercive force as large as 1 KOe or more and having an easy axis of magnetization perpendicularly to the film surface; a substantially transparent magnetic material film layer disposed in contact with the recording film layer, large in the Faraday rotation angle and having an easy axis of magnetization perpendicularly to the film surface and magnetizable in the same direction as the recording film layer by exchange coupling or magnetostatic coupling therebetween; a transparent substrate disposed on the side of incidence of light and on which the magnetic material film layer is disposed, and said substantially transparent magnetic material film layer being composed of material selected from the group consisting of Fe$_3$O$_4$, CoFe$_2$O$_4$ and materials of garnet systems.

2. A magneto-optical recording medium according to claim 1, characterized in that the substantially transparent magnetic material layer increases the magneto-optical rotation angle in the magnetic thin film recording layer.

3. A magneto-optical recording medium according to claim 1, characterized in that the substantially transparent material layer increases the magneto-optical rotation angle by the Faraday effect.

4. A magneto-optical recording medium according to claim 1, characterized in that the thickness of the substantially transparent magnetic material layer is selected in such a region that the figure of merit $\sqrt{R}\cdot\theta_k$ expressed by its reflectivity R and the magneto-optical rotation angle $\theta_k$ is a maximum.

5. A magneto-optical recording medium comprising in succession in the direction of incident light:
a transparent substrate; a substantially transparent film layer of vertically magnetizable material having a large Faraday rotation angle, an easy axis of magnetization perpendicular to the film surface and a selected thickness in the region that the figure of merit $\sqrt{R}\cdot\theta_k$ where R is reflectivity and $\theta_k$ is the magneto-optical rotation angle, is a maximum;
a magnetic thin film recording layer of a magnetic material formed of a rare earth transition metal alloy in contact with the substantially transparent film layer and having between 50° C. and 250√ C. and a coercive force of at least 1KOe and having an easy axis of magnetization perpendicular to the magnetic thin film surface, and,
a protective film; whereby said substantially transparent film layer having said selected thickness at which said figure of merit is maximum effectively improves signal to noise ratio of the reproducing characteristic of the recording medium and makes it possible to effect recording with lower light power on said recording medium.

* * * * *